US006613714B2

(12) United States Patent
Grosch et al.

(10) Patent No.: US 6,613,714 B2
(45) Date of Patent: *Sep. 2, 2003

(54) MULTIMETAL CYANIDE COMPOUNDS, THEIR PREPARATION AND THEIR USE

(75) Inventors: Georg Heinrich Grosch, Bad Dürkheim; Kathrin Harre, Dresden; Jörg Erbes, Karlsruhe; Reinhard Lorenz, Limburgerhof; Stephan Bauer, Hochdorf-Assenheim; Thomas Ostrowski, Castrop-Rauxel; Eva Baum, Schwarzheide; Dieter Junge, Frankenthal, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,145

(22) Filed: Jun. 2, 1999

(65) Prior Publication Data
US 2002/0032121 A1 Mar. 14, 2002

(51) Int. Cl.$^7$ .............. B01J 27/26; B01J 27/20; C01B 21/06
(52) U.S. Cl. ............. 502/175; 502/200; 423/364; 423/367; 423/371; 423/384; 423/414
(58) Field of Search ................ 502/175, 200; 423/364, 367, 371, 384, 414

(56) References Cited

U.S. PATENT DOCUMENTS

| 3,278,457 | A | * | 10/1966 | Milgrom | 568/606 |
|---|---|---|---|---|---|
| 3,278,458 | A | | 10/1966 | Belner | |
| 3,278,459 | A | | 10/1966 | Herold | |
| 3,404,109 | A | | 10/1968 | Milgrom | |
| 3,427,256 | A | | 2/1969 | Milgrom | |
| 3,427,334 | A | | 2/1969 | Belner | |
| 3,829,505 | A | | 8/1974 | Herold | |
| 3,941,849 | A | | 3/1976 | Herold | |
| 4,843,054 | A | | 6/1989 | Harper | |
| 4,877,906 | A | | 10/1989 | Harper | |
| 5,158,922 | A | * | 10/1992 | Hinney et al. | 502/175 |
| 5,426,081 | A | | 6/1995 | Le-Khac | |
| 5,470,813 | A | | 11/1995 | Le-Khac | |
| 5,482,908 | A | | 1/1996 | Le-Khac | |
| 5,498,583 | A | | 3/1996 | Le-Khac | |
| 5,523,386 | A | | 6/1996 | Le-Khac | |
| 5,525,565 | A | | 6/1996 | Le-Khac | |
| 5,545,601 | A | | 8/1996 | Le-Khac | |
| 5,652,329 | A | * | 7/1997 | Le-Khac | 528/415 |
| 6,018,017 | A | * | 1/2000 | Le-Khac | 528/421 |
| 6,303,533 | B1 | | 10/2001 | Grosch et al. | |

FOREIGN PATENT DOCUMENTS

| DE | 148957 | | 6/1981 |
|---|---|---|---|
| DE | 203734 | | 11/1983 |
| DE | 203735 | | 11/1983 |
| DE | 197 42 978 A1 | * | 9/1997 |
| EP | 268922 | | 6/1988 |
| EP | 283148 | | 9/1988 |
| EP | 385619 | | 9/1990 |
| EP | 654302 | | 5/1995 |
| EP | 659798 | | 6/1995 |
| EP | 665254 | | 8/1995 |
| EP | 700949 | | 3/1996 |
| EP | 743093 | | 11/1996 |
| EP | 0755716 | * | 1/1997 |
| EP | 755716 | | 1/1997 |
| EP | 0 862 947 A1 | | 2/1998 |
| EP | 862947 | | 9/1998 |
| JP | 4351632 A | * | 12/1992 |
| WO | WO97/40086 | | 10/1997 |
| WO | WO98/16310 | | 4/1998 |

OTHER PUBLICATIONS

PCT Search Report dated Oct. 10, 2000.
PCT International Search Report, 6 Pages, Dec. 2001.

* cited by examiner

Primary Examiner—Elizabeth D. Wood
(74) Attorney, Agent, or Firm—Fernando A. Borrego

(57) ABSTRACT

In multimetal cyanide complexes, more than 30% by weight of the primary particles have a platelet-like habit, i.e. the length and width of the primary particles is at least three times the thickness of the particles.

6 Claims, No Drawings

MULTIMETAL CYANIDE COMPOUNDS, THEIR PREPARATION AND THEIR USE

The present invention relates to multimetal cyanide compounds, their preparation and their use as catalysts for the preparation of polyether alcohols.

Polyether alcohols are used in large quantities for producing polyurethanes. They are usually prepared by catalytic addition of lower alkylene oxides, in particular ethylene oxide and propylene oxide, onto H-functional initiator substances. Catalysts used are usually basic metal hydroxides or salts, with potassium hydroxide having the greatest industrial importance.

In the synthesis of polyether alcohols having long chains, as are used, in particular, for producing flexible polyurethane foams, secondary reactions occur as chain growth progresses and these lead to faults in the chain structure. These by-products are referred to as unsaturated constituents and have an adverse effect on the properties of the resulting polyurethanes. There has therefore been no lack of attempts in the past to prepare polyether alcohols having a low content of unsaturated constituents. For this purpose, in particular, the alkoxylation catalysts used are altered in a targeted way. Thus, EP-A-268 922 proposes using cesium hydroxide as a catalyst for the preparation of polyether alcohols. Although this does enable the content of unsaturated constituents to be reduced, cesium hydroxide is expensive and disposing of it can be problematic.

Furthermore, the use of multimetal cyanide complexes, usually zinc hexanocyanometalates, for preparing polyether alcohols having low contents of unsaturated constituents is known. There are a large number of documents which describe the preparation of such compounds. Thus, DD-A-203 735 and DD-A-203 734 describe the preparation of polyetherols using zinc hexacyanocobaltate.

The preparation of the zinc hexacyanometalates is also known. These catalysts are usually prepared by reacting solutions of metal salts, usually zinc chloride, with solutions of alkali metal or alkaline earth metal cyanometalates such as potassium hexacyanocobaltate. A water-miscible, heteroatom-containing component is generally added as a ligand to the resulting suspension immediately after the precipitation process. This component can also be present initially in one or both starting solutions. This water-miscible, heteroatom-containing component can be, for example, an ether, polyether, alcohol, ketone or a mixture thereof. Such processes are described, for example, in U.S. Pat. Nos. 3,278,457, 3,278,458, 3,278,459, 3,427,256, 3,427,334, 3,404,109, 3,829,505, 3,941,849, EP 283,148, EP 385,619, EP 654,302, EP 659,798, EP 665,254, EP 743,093, EP 755,716, U.S. Pat. Nos. 4,843,054, 4,877,906, 5,158,922, 5,426,081, 5,470,813, 5,482,908, 5,498,583, 5,523,386, 5,525,565, 5,545,601, JP 7,308,583, JP 6,248,068, JP 4,351,632 and U.S. Pat. No. 5,545,601.

DD-A-148 957 describes the preparation of zinc hexacyanoiridate and its use as catalyst in the preparation of polyether alcohols. Here, hexacyanoiridic acid is used as one starting material. This acid is isolated as a solid and is used in this form.

EP 862 947 describes the preparation of other double metal cyanide complexes, in particular the use of hexacyanocobaltic acid or its aqueous solutions as starting material. The double metal cyanides produced as described in EP 862 947 have a high reactivity in the ring-opening polymerization of alkylene oxides.

Although multimetal cyanide catalysts have high polymerization activities, there has been no lack of attempts to achieve a further increase in the catalytic activity of the multimetal cyanide compounds. The multimetal cyanide compounds described are usually amorphous. The preparation of such multimetal cyanide compounds is disclosed, inter alia, in EP 654,302. It has also been able to be shown that the activity of these catalysts can be increased further by incorporation of polymers. Thus, EP 700,949 describes double metal cyanide complexes which have an increased reactivity and contain from 5 to 80% by weight, based on the catalyst, of polyethers having a molar mass of greater than 500 dalton. WO 97/40 086 describes double metal cyanide catalysts which have an increased reactivity and contain from 5 to 80% by weight of polyethers having molar masses of less than 500 dalton. WO 98/16310 discloses double metal cyanides which contain from 2 to 80% by weight of functionalized polymers. However, no use of polyetherols is described. The catalysts described in the abovementioned documents are amorphous. Advantages of the use of crystalline multimetal cyanide compounds are not disclosed there.

In contrast to the amorphous multimetal cyanide compounds, fewer possible ways of increasing the catalyst activity have been described in the case of the crystalline multimetal cyanide compounds. According to EP 755,716, active crystalline multimetal cyanide compounds are obtained when these catalysts comprise not only the multimetal cyanide component but also residues of metal salt. The amount of metal salt per mole of multimetal cyanide compound has to be less than 0.2 mol.

The further development of active crystalline multimetal cyanide compounds is desirable since crystalline materials are accessible to a far greater number of methods of examination. Thus, X-ray diffraction analysis can elucidate the structure of the materials, scanning electrode microscopy can give information on the morphology of the crystals and transmission electron microscopy even enables the outer surfaces of the crystals to be assigned to various crystallographic planes. All this leads to an improved understanding of the catalyst and its mode of action and provides further starting points for improving the activity.

It is an object of the present invention to develop catalysts in which no large amounts of polymeric compounds extraneous to the system remain. A further object is to prepare the multimetal cyanide compounds in a morphology which allows them to optimally display their intrinsic activity.

We have found that this object is achieved by altering the morphology of crystalline multimetal cyanide compounds by preparing them in the presence of surface-active substances.

The present invention accordingly provides a process for preparing multimetal cyanide compounds comprising the following process steps:

a) Addition of an aqueous solution of a water-soluble metal salt of the formula $M^1_m(X)_n$, where $M^1$ is at least one metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$ and mixtures thereof, X is at least one anion selected from the group consisting of halide, hydroxide, sulfate, carbonate, cyanide, thiocyanate, isocyanate, carboxylate, in particular formate, acetate, propionate or oxalate, and nitrate and m and n are integers which satisfy the valences of $M^1$ and X, to an aqueous solution of a cyanometalate compound of the formula $H_a M^2(CN)_b(A)_c$, where $M^2$ is at least one metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$ and $Cr^{2+}$ and also mixtures thereof and $M^2$ can be identical to or different from $M^1$, H is hydrogen or a metal ion, usually an alkali metal ion, an alkaline earth metal ion or an ammonium ion, A is at least one anion selected from the group consisting of halide, hydroxide, sulfate, carbonate, cyanate, thiocyanate, isocyanate, carboxylate and nitrate, in particular cyanide, where A can be identical to or different from X, and a, b and c are integers which are selected so that the cyanide compound is electrically neutral, where one or both solutions may, if desired, comprise at least one water-miscible, heteroatom-containing ligand selected from the group consisting of alcohols, aldehydes, ketones, ethers, esters, ureas, amides, nitrites and sulfides, b) combination of the aqueous suspension formed in step a) with a water-miscible heteroatom-containing ligand selected from the group described above which can be identical to or different from the ligand in step a), c) if desired, separation of the multimetal cyanide compound from the suspension, wherein the combination of $M^1_m(X)_n$ and $H_aM^2(CN)_b(A)_c$ is carried out in the presence of at least one surface-active substance.

The solution of the water-soluble metal salt and/or the solution of the cyanometalate compound preferably comprises at least one surface-active substance, but it is also possible for the latter to be added to the precipitation suspension formed simultaneously with the combination of the two solutions.

The present invention further provides the multimetal cyanide compounds prepared by this process. The primary particles of these multimetal cyanide compounds preferably have, as a result of the preparation process, a crystalline structure and also a content of platelet-shaped particles of more than 30% by weight, based on the total weight of the multimetal cyanide compound. The platelet shape of the particles leads to an increase in the proportion of catalytically active surface area, based on the total surface area, and thus to an increase in the activity per unit mass.

For the purposes of the present invention, the term "primary particle" refers to the individual crystallite as can be seen, for example, on a scanning electron micrograph. These primary particles can then agglomerate to form secondary particles.

For the purposes of the present invention, the term "platelet-like" or "platelet-shaped" means that the length and width of the primary particles is at least three times the thickness of these particles.

For the purposes of the present invention, the term "crystalline structure" means that the solid has not only short-range order, for example an arrangement of, for example, 6 carbon atoms around a cobalt atom, but also long-range order, i.e. it is possible to define a repeating unit, also known as a unit cell, from which the entire solid can be built up. If a solid is crystalline, this shows up, inter alia, in the X-ray diffraction pattern. In the case of a crystalline substance, the X-ray diffraction pattern displays "sharp" reflections whose intensities are significantly, i.e. by a factor of at least three, above background.

The surface-active compounds used according to the present invention may be anionic, cationic, nonionic and/or polymeric surfactants.

In particular, use is made of nonionic and/or polymeric surfactants. Substances selected from this group are, in particular, fatty alcohol alkoxylates, block copolymers of various epoxides having differing hydrophilicity, castor oil alkoxylates or block copolymers of epoxides and other monomers such as acrylic acid or methacrylic acid. The substances used should have a moderate to good solubility in water.

Fatty alcohol alkoxylates used according to the present invention can be prepared by reacting a fatty alcohol, preferably having from 8 to 36 carbon atoms, in particular from 10 to 18 carbon atoms, with ethylene oxide, propylene oxide and/or butylene oxide. The polyether part of the fatty alcohol alkoxylate used according to the present invention can consist of pure ethylene oxide, propylene oxide or butylene oxide polyethers. Copolymers of two or three different alkylene oxides or block copolymers of two or three different alkylene oxides are also possible. Examples of fatty alcohol alkoxylates having pure polyether chains are Lutensol® AO grades from BASF Aktiengesellschaft. Examples of fatty alcohol alkoxylates having block copolymers as polyether part are Plurafac® LF grades from BASF Aktiengesellschaft. The polyether chains particularly preferably comprise from 2 to 50, in particular from 3 to 15, alkylene oxide units.

Block copolymers as surfactants comprise two different polyether blocks which differ in their hydrophilicity. Block copolymers which can be used according to the present invention may comprise ethylene oxide and propylene oxide (Pluronic® grades, BASF Aktiengesellschaft). The water solubility is controlled via the lengths of the various blocks. The molar masses are in the range from 500 Da to 20,000 Da, preferably from 1000 Da to 6000 Da and in particular from 1500 to 4000 Da. In the ethylene oxide-propylene oxide copolymers, the ethylene oxide content is from 5 to 50% by weight and the propylene oxide content is from 50 to 95% by weight.

Copolymers of alkylene oxide with other monomers used according to the present invention preferably have ethylene oxide blocks. Other monomers which can be used are, for example, butyl methacrylate (PBMA/PEO BE1010/BE1030, Th. Goldschmidt), methyl methacrylate (PMMA/PEO ME1010/ME1030, Th. Goldschmidt) or methacrylic acid (EA-3007, Th. Goldschmidt).

In the process of the present invention, the cyanometalate compound used can be an alkali metal, alkaline earth metal or ammonium salt, or else the cyanometalic acid. The acid is preferably used as cyanometalate compound, since this does not result in unavoidable formation of a salt as by-product.

These cyanometalic acids (hydrogen cyanometalates) are stable and readily handleable in aqueous solution. They can be prepared, for example as described in W. Klemm, W. Brandt, R. Hoppe, Z. Anorg. Allg. Chem. 308, 179 (1961), starting from the alkali metal cyanometalate via the silver cyanometalate to give the cyanometalic acid. A further possible way is to convert an alkali metal or alkaline earth metal cyanometalate into a cyanometalic acid by means of an acid ion exchanger, as described, for example, in F. Hein, H. Lilie, Z. Anorg. Allg. Chem. 270, 45 (1952), or A. Ludi, H.U. Güdel, V. Dvorak, Helv. Chim. Acta 50, 2035 (1967). Further possible ways of synthesizing the cyanometalic acids may be found, for example, in "Handbuch der Präparativen Anorganischen Chemie", G. Bauer (Editor), Ferdinand Enke Verlag, Stuttgart, 1981. For the industrial preparation of these acids, as is necessary for the process of the present invention, the synthesis by means of ion exchangers is the most advantageous route. After they have been synthesized, the cyanometalic acid solutions can be immediately processed further, but it is also possible to store them for a relatively long period of time. They should be stored in the absence of light to prevent decomposition of the acid.

The proportion of acid in the solution should be greater than 80% by weight, based on the total mass of cyanometalate complexes, preferably greater than 90% by weight, in particular greater than 95% by weight.

The heteroatom-containing ligands are, as described above, selected from the group consisting of alcohols, aldehydes, ketones, ethers, esters, ureas, amides, nitriles and sulfides.

To carry out the process of the present invention, an aqueous solution of a cyanometalic acid or a cyanometalate salt is combined with the aqueous solution of a metal salt of the formula $M^1_m(X)_n$, where the symbols are as defined above. Here, a stoichiometric excess of the metal salt is employed. Preference is given to using a molar ratio of the metal ion to the cyanometalate component of from 1.1 to 7.0, preferably from 1.2 to 5.0 and particularly preferably from 1.3 to 3.0. It is advantageous to place the metal salt solution in the precipitation vessel and to add the cyanometalate compound, but the reverse procedure can also be employed. During and after the combination of the starting solutions, good mixing, for example by stirring, is necessary.

The content of cyanometalate compound in the cyanometalate starting solution is from 0.1 to 30% by weight, based on the mass of the cyanometalate starting solution, preferably from 0.1 to 20% by weight, particularly preferably from 0.2 to 10% by weight. The content of metal salt component in the metal salt solution is from 0.1 to 50% by weight, based on the mass of the metal salt solution, preferably from 0.2 to 40% by weight, particularly preferably from 0.5 to 30% by weight.

The surface-active substances are generally added to at least one of the two starting solutions. A preferred embodiment provides for the surface-active substances to be added to the solution which is initially charged for the precipitation. In another preferred embodiment, the surface-active substances are added to both starting solutions. The content of surface-active substances in the precipitation suspension is from 0.01 to 40% by weight, based on the total mass of the precipitation suspension. Preference is given to a content of from 0.1 to 30% by weight.

If the surface-active substances are added to both starting solutions, it is advantageous to divide the necessary amount of surface-active substance between the two starting solutions proportionately to the mass of the respective starting solution.

The heteroatom-containing ligands which can be used if desired are, in particular, added to the suspension resulting from combination of the two starting solutions, with good mixing also having to be ensured.

However, it is also possible to add all or part of the ligand to one or both starting solutions. Here, owing to the change in the salt solubility, the ligand is preferably added to the solution of the cyanometalate compound.

If ligands are used, their content in the suspension formed after the precipitation should be from 1 to 60% by weight, preferably from 5 to 40% by weight, in particular from 10 to 30% by weight, in each case based on the total mass of the suspension.

A preferred embodiment of the preparation process provides for no organic, heteroatom-containing ligand apart from the surface-active substance to be added.

The multimetal cyanide compounds prepared by the process of the present invention have the formula $$M^1a[M^2(CN)bLc]*d\ H2O * eT,$$

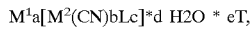

where
M$^1$ and M$^2$ are as defined above,
a, b and c are integers and are selected so that the compound is electrically neutral,
where c is an integer greater than or equal to zero,
d is an integer or a fraction greater than or equal to zero and
e is an integer or a fraction greater than zero,
L is an anion selected from the group consisting of halide, hydroxide, sulfate, carbonate, cyanide, cyanate, thiocyanate, isocyanate, carboxylate, in particular formate, acetate, propionate or oxalate, nitrate and mixtures thereof,
and T is at least one surface-active substance as has been specified above.

The multimetal cyanide compounds prepared according to the present invention are crystalline. X-ray diffraction patterns which can be displayed by the multimetal cyanide compounds of the present invention but do not limit the possible X-ray diffraction patterns are shown in DE 197 42 978, FIGS. 3 and 4. The morphology of the primary crystals of the multimetal cyanide compounds of the present invention is, as stated above, platelet-like. For the purposes of the present invention, platelet-shaped particles are particles whose thickness is one third, preferably one fifth, particularly preferably one tenth, of their length and width. The catalyst of the present invention comprises more than 30% by weight, preferably more than 50% by weight, particularly preferably more than 70% by weight and very particularly preferably more than 90% by weight, of such platelet-shaped crystals.

The thickness of the primary particles according to the present invention is generally less than 300 nm. Preference is given to thicknesses of less than 200 nm, particularly preferably less than 100 nm, very particularly preferably less than 50 nm.

In a preferred embodiment, a monoclinic multimetal cyanide which has the following lattice parameters a=12.4±0.1 Å, b=7.5±0.1 Å, c=8.5±0.1 Å, α=90°, β=94°±1°, γ=90° is obtained. In this case, the thickness of the primary crystals parallel to the crystallographic c axis should be less than 300 nm, preferably less than 200 nm, in particular less than 100 nm. The position of the crystallographic axes in the primary crystal can be determined by X-ray diffraction on primary crystals in a transmission electron microscope. The thickness is, as mentioned above, determined by means of scanning electron microscopy.

Multimetal cyanide compounds which are prepared in the absence of surface-active substances are often in rod form. Furthermore, formation of crystalline multimetal cyanide phases which do not crystallize as platelets despite the addition according to the present invention of surface-active substances is possible. These can then be present in the form of small cube-shaped or spherical crystals.

Depending on how pronounced the platelet character of the particles is and the amount in which they are present in the catalyst, distinct to strong intensity changes in the individual reflections in the X-ray diffraction pattern compared to rod-like multimetal cyanide compounds of the same structure may be observed.

The multimetal cyanide compounds produced by precipitation according to the process described above can then be separated from the suspension by filtration or centrifugation.

The multimetal cyanide compounds can be used in the form of powders, pastes or suspensions as catalysts for the preparation of polyethers, in particular polyether alcohols, by polymerization of alkylene oxides.

When using them as powder, it is advantageous for the multimetal cyanide compounds to be separated from the suspension by filtration, washed with further organic ligand on the filtration apparatus and, after removing the organic ligand again, dried.

In the abovementioned embodiment of the preparation process in which no further organic, heteroatom-containing ligand apart from the surface-active substance is employed, the multimetal cyanide compound is washed with water after being separated from the precipitation suspension.

Drying is carried out at from 30° C. to 100° C., preferably at from 40° C. to 80° C., and at pressures of from 0.0001 bar to 1 bar, preferably from 0.001 bar to 0.5 bar. Drying can also be carried out using microwaves, e.g. in an oven heated by means of microwaves.

In a further embodiment of the process of the present invention, the filter cake obtained after separation from the precipitation suspension is taken from the filtration apparatus, resuspended in organic ligand or water and then separated from the liquid again by filtration.

To prepare the polyether alcohols, the powders obtained as described above are dispersed as finely as possible in the H-functional initiator substance, preferably by an efficient suspension process, in order to achieve a very high activity of the multimetal cyanide catalyst. Such methods of efficiently producing a very finely divided suspension are, inter alia, stirring with high shear forces, as in homogenizers or Ultraturrax apparatuses, and also the use of dispersion machines, in particular ball mills and agitated ball mills, e.g. bead mills in general and particularly those having small milling beads (e.g. 0.3 mm diameter), e.g. the double-cylinder bead mills (DCP-Super Flow®) from Draiswerken GmbH, Mannheim, or the centrifugal fluidized-bed mills from Netzsch Gerätebau GmbH, Selb. If desired, dissolvers can be used for predispersion. Furthermore, a small amount of dispersants known to those skilled in the art, e.g. lecithin, zinc oleate and/or zinc stearate, can be added. In addition, all methods which allow powder to be dispersed as finely as possible in liquids are suitable.

When the catalyst of the present invention is used as a paste, drying of the multimetal cyanide catalyst is usually omitted.

It is also possible to use the multimetal cyanide catalysts in the form of catalyst suspensions, starting from the dried or paste form. The content of multimetal cyanide compounds in these catalyst suspensions is in the range from 0.5 to 20% by weight, preferably from 0.8 to 10% by weight and particularly preferably from 1 to 5% by weight, based on the total mass of the catalyst suspension.

Preferably, catalyst suspensions are prepared from the undried multimetal cyanide compound. Here, a suspension is prepared from the moist multimetal cyanide compound after precipitation and separation of the solid from the suspension and after washing the multimetal cyanide compound, either on the filtration apparatus or externally with subsequent refiltration. For this purpose, the multimetal cyanide compound can be suspended in a polyether, an organic ligand or water.

As polyethers, it is possible to use compounds having molar masses of from 150 to 6000 dalton and functionalities of from 1 to 8. Preference is given to polyethers having molar masses of from 150 to 2000 dalton and functionalities of from 1 to 3, in particular molar masses of from 150 to 800 dalton.

If the undried multimetal cyanide compound is suspended in an organic ligand, suspensions having solids contents of less than 10% by weight are preferred. Particular preference is given to solids contents of less than 5% by weight. Organic ligands which can be used are all the substances mentioned above in the description from the abovementioned substance classes. Preference is given to compounds which have a vapor pressure of greater than 0.005 bar at 100° C.

If the undried multimetal cyanide compound is suspended in water, preference is given to suspensions having a solids content of less than 20% by weight and pastes having a solids content of less than 60% by weight. The water content of the pastes and suspensions should then be above 20% by weight.

If the cyanometalate source used is the corresponding acid and not an alkali metal, alkaline earth metal or ammonium salt, the highly active multimetal cyanide compounds can also be prepared by the following method. Here, the cyanometalate source used is the cyanometalic acid and the metal salt used is an appropriate salt of an acid which has a vapor pressure of greater than 0.005 bar at 100° C. In this embodiment, as described above, the precipitation is carried out in the presence of the organic ligand and the surface-active agent, but the presence of the organic ligand can also be omitted. If an organic ligand is used, it should likewise have a vapor pressure of greater than 0.005 bar at 100° C. Subsequently, a polyether is added to the precipitation suspension and the acid formed in the precipitation, the water and at least part of the organic ligands are distilled off, if desired under reduced pressure. The remaining suspension preferably has a solids content of less than 20% by weight and a polyether content of greater than 80% by weight. Polyethers which can be used are compounds having molar masses of from 150 to 6000 dalton and functionalities of from 1 to 8.

The multimetal cyanide catalysts prepared by the process of the present invention have higher catalytic activities than multimetal cyanide compounds which have not been prepared in the presence of at least one surface-active substance and thus contain less than 30% by weight, based on the mass of multimetal cyanide compound, of platelet-like multimetal cyanide compounds. They are very useful as catalysts for the synthesis of polyetherols having functionalities of from 1 to 8, preferably from 1 to 6, and molar masses of from 500 to 50,000, preferably from 800 to 15,000, by reaction of H-functional initiator substances with alkylene oxides. The catalyst concentrations employed in the preparation of the polyether alcohols are preferably less than 1% by weight, more preferably less than 0.5% by weight, particularly preferably less than 1000 ppm, very particularly preferably less than 500 ppm and especially preferably less than 100 ppm, based on the total mass of the polyetherol. The preparation of the polyetherols can be carried out either continuously or batchwise. The synthesis can be carried out by suspension, fixed-bed, moving-bed or fluidized-bed methods. When using fixed, moving or fluidized beds, the multimetal cyanide compounds of the present invention are applied to solid organic or inorganic supports, introduced into such supports or shaped to form unsupported catalysts. The temperatures in the polyether synthesis are usually in the range from 50° C. to 200° C., with preference being given to temperatures in the range from 90° C. to 150° C., in particular from 90 to 130° C. The pressures used in the synthesis are in the range from 0 to 15 bar, preferably from 0 to 10 bar and in particular from 0 to 5 bar.

To prepare polyether alcohols using the catalysts of the present invention, it is possible to employ compounds having at least one alkylene oxide group, for example ethylene oxide, 1,2-epoxypropane, 1,2-methyl-2-methylpropane, 1,2- epoxybutane, 2,3-epoxybutane, 1,2-methyl-3-methylbutane, 1,2-epoxypentane, 1,2-methyl-3-methylpentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, (2,3-epoxypropyl)benzene, vinyloxirane, 3-phenoxy-1,2-epoxypropane, 2,3-epoxy (methyl ether), 2,3-epoxy(ethyl ether), 2,3-epoxy(isopropyl ether), 2,3-epoxy-1-propanol, 3,4-epoxybutyl stearate, 4,5-epoxypentyl acetate, 2,3-epoxypropyl methacrylate, 2,3-epoxylpropyl acrylate, gylcidyl butyrate, metyl glycidate, ethyl 2,3-epoxybutanoate, 4-(trimethylsilyl)butane 1,2-epoxide, 4-(triethylsilyl)butane 1,2-epoxide, 3-(perfluoromethyl)propene oxide, 3-(perfluoroethyl) propene oxide, 3-(perfluorobutyl)propene oxide, 4-(2,3-epoxypropyl)morpholine, 1-(oxiran-2-ylmethyl)pyrrolidin-2-one and also any mixtures of at least two of the epoxides mentioned.

Preference is given to ethylene oxide, 1,2-epoxypropane (propylene oxide), 1,2-epoxybutane, styrene oxide, vinyloxirane and any mixtures of these, in particular ethylene oxide, 1,2-epoxypropane and mixtures of ethylene oxide and 1,2-epoxypropane (propylene oxide).

The invention is illustrated by the following examples:
Preparation of hexacyanocobaltic acid 7 l of strong acid ion exchanger in the sodium form (Amberlite® 252 Na, Rohm & Haas) were introduced into an ion-exchange column (length: 1 m, volume: 7.7 l). The ion exchanger was subsequently converted into the H form by passing 10% strength hydrochloric acid through the ion-exchange column for 9 hours at a rate of bed volumes per hour until the sodium content in the discharged liquid was less than 1 ppm. The ion exchanger was subsequently washed with water until neutral. The regenerated ion exchanger was then used to prepare a hexacyanocobaltic acid which was essentially free of alkali metals. For this purpose, a 0.24 molar solution of potassium hexacyanocobaltate in water was passed through the ion exchanger at a rate of 1 bed volume per hour. After 2.5 bed volumes, the potassium hexacyanocobaltate solution was replaced by water. The 2.5 bed volumes obtained had an average hexacyanocobaltic acid content of 4.5% by weight and alkali metal contents of less than 1 ppm. The hexacyanocobaltic acid solutions used for the further examples were diluted appropriately with water.

Comparative Example 1

200 ml of an aqueous hexacyanocobaltic acid solution (4.4% by weight of $H_3[Co(CN)_6]$, potassium content <1 ppm) were heated to 40° C. and subsequently admixed while stirring (blade stirrer, rotational speed =500 min$^{-1}$) with a solution of 17.88 g of zinc(II) acetate dihydrate in 60 g of water. 35 g of tert-butanol were subsequently added to the suspension. The suspension was stirred for a further 30 minutes at 40° C. The solid was then filtered off with suction and washed on the filter with 200 ml of tert-butanol. The solid which had been treated in this way was dried at 50° C. under reduced pressure for 16 hours. The X-ray diffraction pattern of the double metal cyanide obtained in this way could be indexed as monoclinic; the scanning electron micrographs showed rod-shaped particles.

EXAMPLE 1

300 ml of an aqueous hexacyanocobaltic acid solution (2.2% by weight of $H_3[Co(CN)_6]$, potassium content =1 ppm) were heated to 40° C. and, while stirring (blade stirrer, rotational speed =500 min$^{-1}$), 15 ml of Pluronic® PE 6100 (BASF Aktiengesellschaft, block copolymer of propylene oxide and ethylene oxide) were added and dissolved. Subsequently, a solution of 13.38 g of zinc(II) acetate dihydrate in 50 g of water was added while stirring (blade stirrer, rotational speed =500 min$^{-1}$). 50 g of tert-butanol were subsequently added to the suspension. The suspension was stirred for a further 30 minutes at 40° C. The solid was then filtered off with suction and washed on the filter with 200 ml of tert-butanol. The solid which had been treated in this way was dried at 50° C. under reduced pressure for 16 hours. The X-ray diffraction pattern of the double metal cyanide obtained in this way showed two phases of which one could be indexed as monoclinic and the other could be indexed as cubic; the scanning electron micrographs showed relatively large platelet-shaped particles and traces of small cubic particles.

EXAMPLE 2

300 g of an aqueous hexacyanocobaltic acid solution (2.2% by weight of $H_3[Co(CN)_6]$, potassium content =1 ppm) were heated to 40° C. and, while stirring (blade stirrer, rotational speed =500 min$^{-1}$), 30 ml of Pluronic® PE 6100 (BASF Aktiengesellschaft, block copolymer of propylene oxide and ethylene oxide) were added and dissolved. Subsequently, a solution of 13.38 g of zinc(II) acetate dihydrate in 50 g of water was added while stirring (blade stirrer, rotational speed =500 min$^{-1}$). 50 g of tert-butanol were subsequently added to the suspension. The suspension was stirred for a further 30 minutes at 40° C. The solid was then filtered off with suction and washed on the filter with 200 ml of tert-butanol. The solid which had been treated in this way was dried at 50° C. under reduced pressure for 16 hours. The X-ray diffraction pattern of the double metal cyanide obtained in this way showed two phases of which one could be indexed as monoclinic and the other could be indexed as cubic; the scanning electron micrographs showed relatively large platelet-shaped particles and traces of small cubic particles.

EXAMPLE 3

200 g of an aqueous hexacyanocobaltic acid solution (3.7% by weight of $H_3[Co(CN)_6]$, potassium content =1 ppm) were heated to 40° C. and, while stirring (blade stirrer, rotational speed =500 min$^{-1}$), 0.5 ml of Plurafac® LF 400 (BASF Aktiengesellschaft) were added and dissolved. Subsequently, a solution of 14.9 g of zinc(II) acetate dihydrate in 60 g of water was added while stirring (blade stirrer, rotational speed =500 min$^{-1}$). 35 g of tert-butanol were subsequently added to the suspension. The suspension was stirred for a further 30 minutes at 40° C. The solid was then filtered off with suction and washed on the filter with 200 ml of tert-butanol. The solid which had been treated in this way was dried at 50° C. under reduced pressure for 16 hours. The X-ray diffraction pattern of the double metal cyanide obtained in this way showed one crystalline phase which could be indexed as monoclinic; the scanning electron micrographs showed platelet-shaped particles.

EXAMPLE 4

300 g of an aqueous hexacyanocobaltic acid solution (2.2% by weight of $H_3[Co(CN)_6]$, potassium content <1 ppm) were heated to 40° C. and, while stirring (blade stirrer, rotational speed =500 min$^{-1}$), 10 ml of Pluronic® PE 6100 (BASF Aktiengesellschaft) were added and dissolved. Subsequently, a solution of 13.38 g of zinc(II) acetate dihydrate in 50 g of water was added while stirring (blade stirrer, rotational speed =500 min$^{-1}$). 35 g of dipropylene glycol were subsequently added to the suspension. The suspension was stirred for a further 30 minutes at 40° C. The solid was then filtered off with suction and washed on the filter with 200 ml of dipropylene glycol. The moist solid was treated at 50° C. under reduced pressure for 16 hours and subsequently packed in moist form.

EXAMPLE 5

479.3 g of an aqueous zinc acetate solution (13.38 g of zinc acetate dihydrate and 2.2 g of Pluronic® PE 6200 (BASF Aktiengesellschaft) were heated to 50° C. While stirring (screw stirrer, stirring energy input: 1 W/l), 558 g of an aqueous hexacyanocobaltic acid solution (cobalt content: 9 g/l, 1.5% by weight of Pluronic® PE 6200 (BASF Aktiengesellschaft), based on the hexacyanocobaltic acid solution), were then metered in over a period of 20 minutes. After all the hexacyanocobaltic acid had been metered in, the mixture was stirred for a further 5 minutes at 50° C. The temperature was subsequently lowered to 40° C. over a period of one hour. The precipitated solid was separated from the liquid by means of a pressure filter and was washed with water. The moist filter cake was subsequently dispersed in the amount of water required to form a 5% strength by weight multimetal cyanide suspension.

EXAMPLE 6

The synthesis was carried out in a cleaned and dried 1 l stirring autoclave. 150 g of polypropylene glycol were placed in the stirring autoclave and admixed with 80 ppm of multimetal cyanide catalyst from Example 5 (based on solids content/final product). The contents of the reactor were made inert with nitrogen and treated at 127° C. under reduced pressure for 1.25 hours. 1 mol of propylene oxide was subsequently metered in at 130° C. and the start of the reaction was awaited. Subsequently, the remaining propylene oxide to a total amount of 620 g was metered in. The addition time was 3 hours and the pressure maximum was 4 bar absolute. The product was worked up by vacuum distillation and filtration.
Hydroxyl number: 57 mg KOH/g;
Viscosity at 25° C.: 320 mPas;
Zn/Co content: 4.1/<1 ppm.

Comparative Example 2

The synthesis was carried out in a cleaned and dried 1 l stirring autoclave. 200 g of polypropylene glycol were placed in the stirring autoclave and admixed with 250 ppm of catalyst from Comparative Example 1. The contents of the reactor were made inert with nitrogen and treated at 108° C. under reduced pressure for 1 hour. 1 mol of propylene oxide was subsequently metered in at 115° C. and the start of the reaction was awaited. Subsequently, the remaining propylene oxide to a total amount of 800 g was metered in. The addition time was 1.1 hours and the pressure maximum was 3.9 bar absolute. The product was worked up by vacuum distillation and filtration.
Hydroxyl number: 52 mg KOH/g;
Viscosity at 25° C.: 516 mPas;
Zn/Co content: 62/25 ppm.

EXAMPLE 7

The synthesis was carried out in a cleaned and dried 1 l stirring autoclave. 200 g of polypropylene glycol were placed in the stirring autoclave and admixed with 100 ppm of catalyst from Example 4. The contents of the reactor were made inert with nitrogen and treated at 105° C. under reduced pressure for 1 hour. 1 mol of propylene oxide was subsequently metered in at 110° C. and the start of the reaction was awaited. Subsequently, the remaining propylene oxide to a total amount of 800 g was metered in. The addition time was 1.6 hours and the pressure maximum was 4.2 bar absolute. The product was worked up by vacuum distillation and filtration.
Hydroxyl number: 53 mg KOH/g;
Viscosity at 25° C.: 571 mPas;
Zn/Co content: 2.7/<2 ppm.

EXAMPLE 8

The synthesis was carried out in a cleaned and dried 1 l stirring autoclave. 200 g of polypropylene glycol were placed in the stirring autoclave and admixed with 125 ppm of catalyst from Example 2. The contents of the reactor were made inert with nitrogen and treated at 105° C. under reduced pressure for 1 hour. 1 mol of propylene oxide was subsequently metered in at 115° C. and the start of the reaction was awaited. Subsequently, the remaining propylene oxide to a total amount of 800 g was metered in. The addition time was 0.75 hour and the pressure maximum was 4.1 bar absolute. The product was worked up by vacuum distillation and filtration.
Hydroxyl number: 56 mg KOH/g;
Viscosity at 25° C.: 470 mPas;
Zn/Co content: 6.5/2.2 ppm.

EXAMPLE 9

The synthesis was carried out in a cleaned and dried 1 l stirring autoclave. 200 g of polypropylene glycol were placed in the stirring autoclave and admixed with 125 ppm of catalyst from Example 3. The contents of the reactor were made inert with nitrogen and treated at 105° C. under reduced pressure for 1 hour. 1 mol of propylene oxide was subsequently metered in at 115° C. and the start of the reaction was awaited. Subsequently, the remaining propylene oxide to a total amount of 800 g was metered in. The addition time was 1 hour and the pressure maximum was 4.6 bar absolute. The product was worked up by vacuum distillation and filtration.
Hydroxyl number: 53 mg KOH/g;
Viscosity at 25° C.: 337 mPas;
Zn/Co content: 14/5.2 ppm.

We claim:
1. A multimetal cyanide complex comprising the formula

$$M^1_a[M^2(CN)_bL_c]*dH_2O*eT$$

wherein $M^1$ is at least one metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cd^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, and mixtures thereof; $M^2$ is at least one metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$, $Cr^{2+}$, and mixtures thereof; a, b, and c are integers and are selected so that the complex is electrically neutral and c is greater than or equal to zero; d is an integer or a fraction greater than zero; e is an integer or fraction greater than zero; L is an anion selected from the group consisting of halide, hydroxide, sulfate, carbonate, cyanide, cyanate, thiocyanate, isocyanate, carboxylate, formate, acetate, propionate, oxalate, nitrate, and mixtures thereof; T comprises a surface-active substance; and in which more than 30% by weight of primary particles of the multimetal cyanide complex have a platelet-like shape meaning that the length and width of the primary particles is at least three times the thickness of the primary particles.

2. A multimetal cyanide complex as claimed in claim 1, wherein the multimetal cyanide complex is essentially crystalline.

3. A multimetal cyanide complex as claimed in claim 1, wherein the thickness of the primary particles is less than 300 nm.

4. A process for preparing a multimetal cyanide complex in which more than 30% by weight of primary particles of the multimetal cyanide complex have a platelet-like shape meaning the length and width of the primary particles is at least three times the thickness of the primary particles, comprising:

combining a metal salt of the formula $M^1{}_m(X)_n$ wherein $M^1$ is at least one metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^+$, $Cd^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$ and mixtures thereof; X is at least one anion selected from the group consisting of halide, hydroxide, sulfate, carbonate, cyanide, thiocyanate, isocyanate, carboxylate, formate, acetate, propionate, oxalate, and nitrate; and m and n are integers having values which satisfy the valences of $M^1$ and X with a cyanometalate compound of the formula $H_aM^2(CN)_b(A)_c$ wherein $M^2$ is at least one metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$, $Cr^{2+}$, and mixtures thereof; H is a hydrogen, a metal ion, or an ammonium ion; A is at least one anion selected from the group consisting of halide, hydroxide, sulfate, carbonate, cyanide, cyanate, thiocyanate, isocyanate, carboxylate, and nitrate;

in the presence of at least one surface-active substance such that more than 30% by weight of the primary particles have the platelet-like shape.

5. A process as claimed in claim 4 wherein the surface-active substances used are reaction products of fatty alcohols with alkylene oxides.

6. A process as claimed in claim 4 wherein the surface-active substances used are block copolymers of alkylene oxides having different hydrophilicities.

* * * * *